E. V. MYERS.
METHOD OF MAKING TIRE VALVES.
APPLICATION FILED MAY 22, 1917. RENEWED MAR. 24, 1921.

1,402,247.

Patented Jan. 3, 1922.

WITNESSES:
René Bruine
T. F. Wallace

INVENTOR
Eugene V. Myers
By Attorneys,
Fraser, Turk & Myers

UNITED STATES PATENT OFFICE.

EUGENE V. MYERS, OF EAST ORANGE, NEW JERSEY, ASSIGNOR TO A. SCHRADER'S SON, INCORPORATED, OF BROOKLYN, NEW YORK, A CORPORATION OF NEW YORK.

METHOD OF MAKING TIRE VALVES.

1,402,247.      Specification of Letters Patent.      Patented Jan. 3, 1922.

Original application filed March 21, 1916, Serial No. 85,633. Divided and this application filed May 22, 1917, Serial No. 170,179. Renewed March 24, 1921. Serial No. 455,326.

*To all whom it may concern:*

Be it known that I, EUGENE V. MYERS, a citizen of the United States of America, residing in East Orange, in the county of Essex and State of New Jersey, have invented certain new and useful Improvements in Methods of Making Tire Valves, of which the following is a specification.

This application is a division of my application, Serial No. 85,633, filed March 21, 1916, and is directed to a method of forming tire valve casings or stems set forth in said application.

Valves for pneumatic tires usually comprise a long casing member commonly called a valve stem which is provided with a bore from end to end. The maximum diameter of such casings is limited due to the condition that the valve must pass through a hole in the vehicle rim, and such hole is limited in size. Hence the internal bore must necessarily be of small dimensions. In those constructions wherein the valve casing is provided with a reduced nipple at its inner end the diameter of this bore is still further limited.

Within the bore is usually located a valve seat and a valve plunger, together with a spring for operating the plunger, and these parts are customarily made separately and inserted within the bore by screwing them in.

The valve casings as thus described have almost invariably been made of brass owing to the fact that the valves in use are subjected to wet and moisture and would speedily rust if not formed of a non-rusting metal. It is particularly desirable that the inner parts of the valve casing and particularly the portions near the inner end shall be rust-proof, since it is at these portions that the actual working parts of the valve are located. It has also been customary to nickel-plate the casings but it is found in practice that the nickel-plating does not extend to any material extent into the bore of the valve casing.

The most expensive part of the valve is the casing and it materially increases the cost thereof to construct it of brass or other expensive non-corroding metal. The object of the present invention is to reduce the cost of the casing by forming it at least in part of steel or other cheap metal in such manner as to avoid the deleterious effects of rust, particularly on the inner part of the casing.

In the drawings I have shown several constructions of the invention.

Referring to the drawings:—

Figure 1:
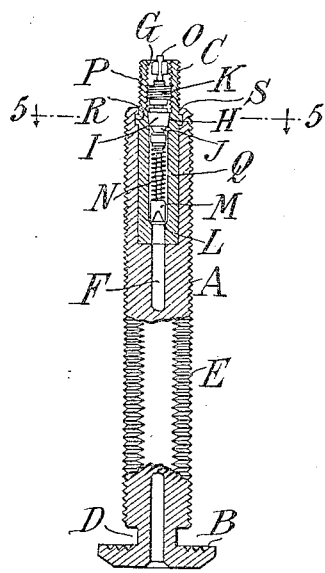
Figure 1 is a view partly in diametrical section of one construction.

Referring first to Fig. 1, let A indicate the body of the casing, B its flanged foot, and C its nipple. This construction is that of the standard Schrader valve. The casing A is provided above the flanged foot B with a recess D designed to receive the edges of the tire tube. It is screw-threaded on its exterior at E to receive a rim nut, dust cap, etc. Extending through the casing A is a bore F which in the construction shown is enlarged at its upper end to receive the working parts of the valve. In the usual construction the upper end of the bore is interiorly screw-threaded at G, and immediately below the screw-threaded part is a tapered shoulder H which is adapted to engage the packing I of a valve seat member J. A plug K is provided which engages the screw-thread G and forces the packing I against the shoulder H. A lower shoulder L is usually provided to engage a spring holder M which forms a stop for the lower part of the spring N. The plug K, seat J, spring N, and spring holder M are linked together by a pin O, so that the valve parts are removable as a whole.

According to the present invention as shown in this figure, the body A of the casing and the foot B are constructed of steel, iron, or some other cheap metal. This will preferably be nickel or copper-plated on its exterior so as to resist rusting action. This is the least important part of the valve casing, so far as rust is concerned, and a proper coating can be made since it is on the exterior of the casing.

With regard to the interior of the casing, however, it is impossible by ordinary methods to protect the metal from rusting, since the metal will not electrolytically deposit into the bore of the valve. The parts which should be particularly protected are the shoulder H, the thread G and that part of the bore which mainly receives the valve insides or working parts. The valve cap and pump coupling (which are not shown) which are habitually and frequently used with pneumatic tires also render it difficult to protect the exterior thread P of the nipple sufficiently by plating methods to avoid wearing off and rusting.

In the construction shown in Fig. 1 I hence construct the valve casing in two parts, one the body A of the casing, which as before stated is preferably of some cheap metal, and the other an insert Q which is of brass, copper, or other non-rusting metal. The insert Q preferably contains all of the working parts, and is formed with the nipple C, so that no rusting is possible on the interior of the insert and the exterior and interior of the nipple.

The insert Q according to the present invention is permanently attached to the body of the casing in such manner that the two parts constitute a single casing. It is to be clearly distinguished from those constructions in which a plug is provided for the valve casing and which carries the working parts of the valve. Such constructions are invariably used for the purpose of providing larger working parts of the valve, the valve parts being introduced through the bottom of the plug. In order to gain access to the working parts in such constructions it is essential that the plug be removable, and this has introduced an element of weakness into such constructions which has never been overcome. A removable joint is constantly open to leakage, particularly on account of the torsional strain which is put upon the plug in screwing and unscrewing couplings, caps etc. The invention shown in Fig. 1 is directed to that type of valve in which the valve insides are removable through the top, and the insert is a permanent and fixed part of the valve shell and connected to it with a leak-tight joint.

The union between the insert and the body of the casing must be such as to prevent displacement by pressure and leakage around the joint.

I have found in practice that the parts can be united by making the insert of slightly larger diameter than the bore in which it fits, and forcing the insert by pressure into the bore. This produces a leak-tight joint, the slight unevenness of the two parts being compensated by the flowing or smoothing down of the walls of the insert. Such a construction is found to prevent leakage under high pressure. It is preferable, however, to form a small shoulder such as R on the insert and turn a flange, such as S, over the top of it, in order to avoid any possibility of dislodgement. Such a construction will also resist the ordinary torsional strains of screwing and unscrewing the cap and pump coupling, but if desired non-circular surfaces may be formed on the insert and valve body as shown in Fig. 5 where the shoulder R is polygonal and the top of the bore of the body is suitably formed to provide an additional safeguard against turning, or any other suitable mode may be employed for this purpose. If desired also the insert may be smaller at the bottom than at the top, and the bore correspondingly shaped (see Fig. 4).

By this construction I secure in effect a valve having the same rust-resisting properties as a brass valve at those points where it is essential that these properties shall be present. At the same time the cost of construction is greatly reduced, since the weight of metal used in the brass insert is comparatively small in proportion to the total weight of the valve body. As thus constructed the valve in appearance is similar to an ordinary brass valve. It may be nickeled when completed or coated on its exterior, as may be desired.

Figure 2:
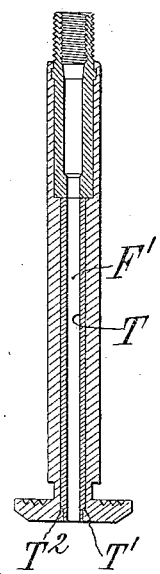
Fig. 2 is a sectional view of another construction.

Fig. 2 shows a similar construction except that the bore F' is protected by a sleeve T of some rust-resisting material, such as brass, lead, or the like. The sleeve may have a shoulder T' at its bottom designed to rest against a similar shoulder T² formed on the interior of the shell. As the function of this sleeve is only to prevent rusting of the bore, no special pains need be taken to provide a leak-tight joint between the sleeve and the casing.

Figure 3:
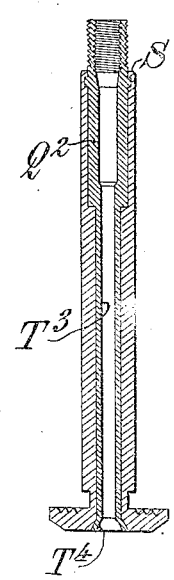
Fig. 3 is a similar view of another construction.

In Fig. 3 the construction is similar except that the insert Q² is provided with an integral sleeve T³. In this construction a flange T⁴ may be formed at the lower end of the casing. In this construction if a line of solder is made between the end of the sleeve and the foot B, or other means be adopted at the foot to secure a leak-tight joint, the fit of the insert and sleeve need not be precise. In such construction, particularly if the flange S at the top of the casing is of sufficient strength to mechanically hold the insert, the line of solder need only be such as to prevent the leakage of air between the insert and the casing.

In the constructions of Figs. 1, 2 and 3 the insert may be united to the body of the shell before the drilling, seat-forming operations and screw-threading operations are performed on the insert, or these may be done prior to the insertion.

Figure 4:
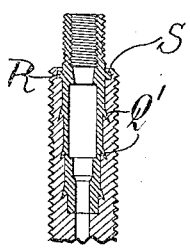
Fig. 4 is a similar vew of another construction.
Figure 5:
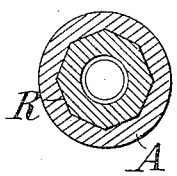
Fig. 5 is a cross-section of a detail taken on the line 5—5 in Fig. 1.

In Fig. 4 I have illustrated another construction of insert having a flange Q' (preferably a plurality of them) which are designed to contact with similar internal flanges on the steel valve body. As the plug is forced in under pressure, these flanges are bent back and not only secure a mechanical joint but an air-tight joint between the parts. This construction may also include the shoulder R and flange S of Fig. 1, or other suitable means for the same purposes.

Figure 6:
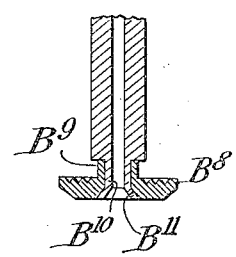
Fig. 6 is a diametrical section of a foot construction.

In Fig. 6 a construction is shown in which a brass or other rust resisting foot $B^8$ is employed. In this case the brass foot is preferably provided with a collar $B^9$, and the casing is provided with an integral sleeve $B^{10}$ passing through the collar and upset on the under side of the foot. A line of solder may be employed at $B^{11}$ and the parts may be forced together with a leak-tight joint. This construction may be considerably varied and is adaptable for use with metals of similar character.

In any of the constructions described it is obvious that a packing of metal or other substance can be introduced between the two parts, although ordinarily this will not be necessary.

While I have shown and described several forms of the invention, it will be undertood that I do not wish to be limited thereto, since various changes can be made therein without departing from the spirit of the invention.

What I claim is:—

1. The method of constructing a composite and unitary valve shell or the like which comprises the formation of a body of strong and rigid metal, and a separate end part, and uniting the two by forcing one into a bore in the other to such extent as to produce a permanent, leak-tight, metal-to-metal joint between the parts.

2. The method of constructing a composite and unitary valve shell or the like which comprises the formation of a body of strong and rigid metal, and a separate end part, and uniting the two by forcing one into a bore in the other to such extent as to produce a permanent, leak-tight, metal-to-metal joint between the parts, and forcing one metal so that it overlies the other to prevent withdrawal of the parts.

3. The method of constructing a composite and unitary valve shell or the like which comprises the formation of a body of strong and rigid metal, and a separate end part, and uniting the two by forcing one into a bore in the other to such extent as to produce a permanent, leak-tight, metal-to-metal joint between the parts, and forming a non-circular connection between the two to prevent relative rotation.

4. The method of constructing a composite and unitary valve shell or the like which comprises the formation of a body of strong and rigid oxidizing material having a bore, forming an insert with a bore and an internal thread, and uniting said insert with said body by forcing the insert into said bore to such extent as to produce a permanent, leak-tight, metal-to-metal joint between the parts.

5. The method of forming a composite valve shell which consists in constructing the body of the valve of strong, rigid, oxidizing material, providing said body with a bore in its outer end, constructing an insert of rust-resisting material, said insert having a bore, an internally threaded end, a shoulder below said thread, and a valve chamber below said shoulder and uniting said insert to said body within said bore to secure a permanent metallic joint between said parts.

6. The method of constructing a composite and unitary valve shell or the like which comprises the formation of a body of strong and rigid oxidizing material having a bore, forming an insert of rust-resisting material, forcing the insert an extended distance into said bore after the walls contact, whereby to cause a wiping action of one part upon the other to secure a permanent, leak-tight joint between the parts.

7. The method of constructing a composite and unitary valve shell or the like which comprises the formation of a body of strong and rigid metal, and a separate end part, one of said parts entering the other, and one of said parts on its contacting surface having protruding portions adapted to displace metal on the other of said parts, and uniting the two by forcing the parts together to such extent as to produce a permanent, metal-to-metal joint between the parts.

8. The method of constructing a composite and unitary valve shell or the like which comprises the formation of a body of strong and rigid metal, such as iron or steel, and a separate end part, one of said parts entering the other, and the iron or steel part being formed with ridges adapted to displace metal on the other part, and uniting the two by forcing the same together to such extent as to produce a permanent, leak-tight, metal-to-metal joint between the parts.

9. The method of constructing a composite and unitary valve shell or the like which comprises the formation of a body of strong and rigid metal, such as iron or steel, and a separate end part, one of said parts entering the other, and both of said parts being constructed with ridges, and forcing the parts together to such extent as to produce a permanent, leak-tight, metal-to-metal joint between the parts.

10. The method of constructing a composite and unitary valve shell or the like which comprises the formation of a body of strong and rigid material and a separate foot portion, and uniting the two by forcing one into a bore in the other to such extent as to produce a permanent, leak-tight, metal-to-metal joint between the parts.

In witness whereof, I have hereunto signed my name.

EUGENE V. MYERS.